United States Patent
Kopikare et al.

(10) Patent No.: US 8,886,833 B1
(45) Date of Patent: Nov. 11, 2014

(54) METHOD AND APPARATUS FOR PEER-TO-PEER NETWORKING

(75) Inventors: Milind Kopikare, San Jose, CA (US); Paul A. Lambert, Mountain View, CA (US); Sarang Shrikrishna Wagholikar, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 692 days.

(21) Appl. No.: 12/822,957

(22) Filed: Jun. 24, 2010

Related U.S. Application Data

(60) Provisional application No. 61/219,922, filed on Jun. 24, 2009.

(51) Int. Cl.
*G06F 15/16* (2006.01)
*H04L 29/08* (2006.01)

(52) U.S. Cl.
CPC ..... *H04L 29/08351* (2013.01); *H04L 29/08306* (2013.01); *H04L 29/08324* (2013.01); *H04L 67/1051* (2013.01)
USPC ............ 709/245; 709/227; 709/228; 709/246

(58) Field of Classification Search
CPC .................. H04L 29/08306; H04L 29/08324; H04L 29/08351; H04L 67/1051
USPC ........................... 709/222, 227, 228, 245, 246
See application file for complete search history.

(56) References Cited

U.S. PATENT DOCUMENTS

| | | | |
|---|---|---|---|
| 2005/0135286 A1* | 6/2005 | Nurminen et al. | 370/310 |
| 2006/0126622 A1* | 6/2006 | Park et al. | 370/389 |
| 2009/0109946 A1* | 4/2009 | Morton et al. | 370/338 |
| 2010/0020746 A1* | 1/2010 | Zaks | 370/328 |
| 2011/0010246 A1* | 1/2011 | Kasslin et al. | 705/14.64 |

OTHER PUBLICATIONS

Peer-to-Peer Technical Specification, Revision 1.0, Wi-Fi Alliance Peer-to-Peer Technical Task Group, May 12, 2009.*
International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, (1999).
IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, (1999).

(Continued)

*Primary Examiner* — Brian J Gillis

(57) ABSTRACT

A network interface comprises a random or pseudo-random number generator. The network interface determines that a first communication device is group owner of a peer-to-peer (P2P) group, and randomly or pseudo-randomly generates a media access control (MAC) address for the first communication device using the random or pseudo-random number generator. The network interface utilizes the randomly or pseudo-randomly generated MAC address for the first communication device in group owner communications with one or more second communication devices in the P2P group.

16 Claims, 3 Drawing Sheets

(56) References Cited

OTHER PUBLICATIONS

IEEE Std 802.11b-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band—Corrigendum 1," *The Institute of Electrical and Electronics Engineers, Inc.*, Nov. 7, 2001.

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, Apr. 2003.

S. A. Mujtaba, "IEEE P802.11—Wireless LANS, TGn Sync Proposal Technical Specification," *The Institute of Electrical and Electronics Engineers, Inc.*, doc.: IEEE 802.11-04/0889r6, May 2005.

"IEEE P802.11n™/D3.00, Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, Sep. 2007.

"IEEE Std. 802.11n™ IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, Oct. 2009.

\* cited by examiner

US 8,886,833 B1

METHOD AND APPARATUS FOR PEER-TO-PEER NETWORKING

CROSS-REFERENCE TO RELATED APPLICATION

This disclosure claims the benefit of U.S. Provisional Patent Application No. 61/219,922, entitled "Method for Group Owner Determination," which was filed on Jun. 24, 2009, the entire disclosure of which is hereby incorporated by reference herein.

FIELD OF THE DISCLOSURE

The present disclosure relates generally to communication networks and, more particularly, to wireless peer-to-peer networks.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

When operating in an infrastructure mode, wireless local area networks (WLANs) typically include an access point (AP) and one or more client devices. When operating in a peer-to-peer (P2P) mode, on the other hand, a dedicated AP is not required. Rather, in a P2P wireless network, a peer-to-peer group can be dynamically formed (e.g., independent of a fixed physical location) from a set of peer-to-peer-enabled wireless communication devices ("P2P devices"). One of the set of P2P devices operates as a P2P group owner of the P2P group, and the others in the set operate as P2P clients.

SUMMARY

In one embodiment, an apparatus comprises a network interface having a random or pseudo-random number generator. The network interface is configured to determine that a first communication device is group owner of a peer-to-peer (P2P) group, and randomly or pseudo-randomly generate a media access control (MAC) address for the first communication device using the random or pseudo-random number generator. The network interface is also configured to utilize the randomly or pseudo-randomly generated MAC address for the first communication device in group owner communications with one or more second communication devices in the P2P group.

DETAILED DESCRIPTION

Figure 1:
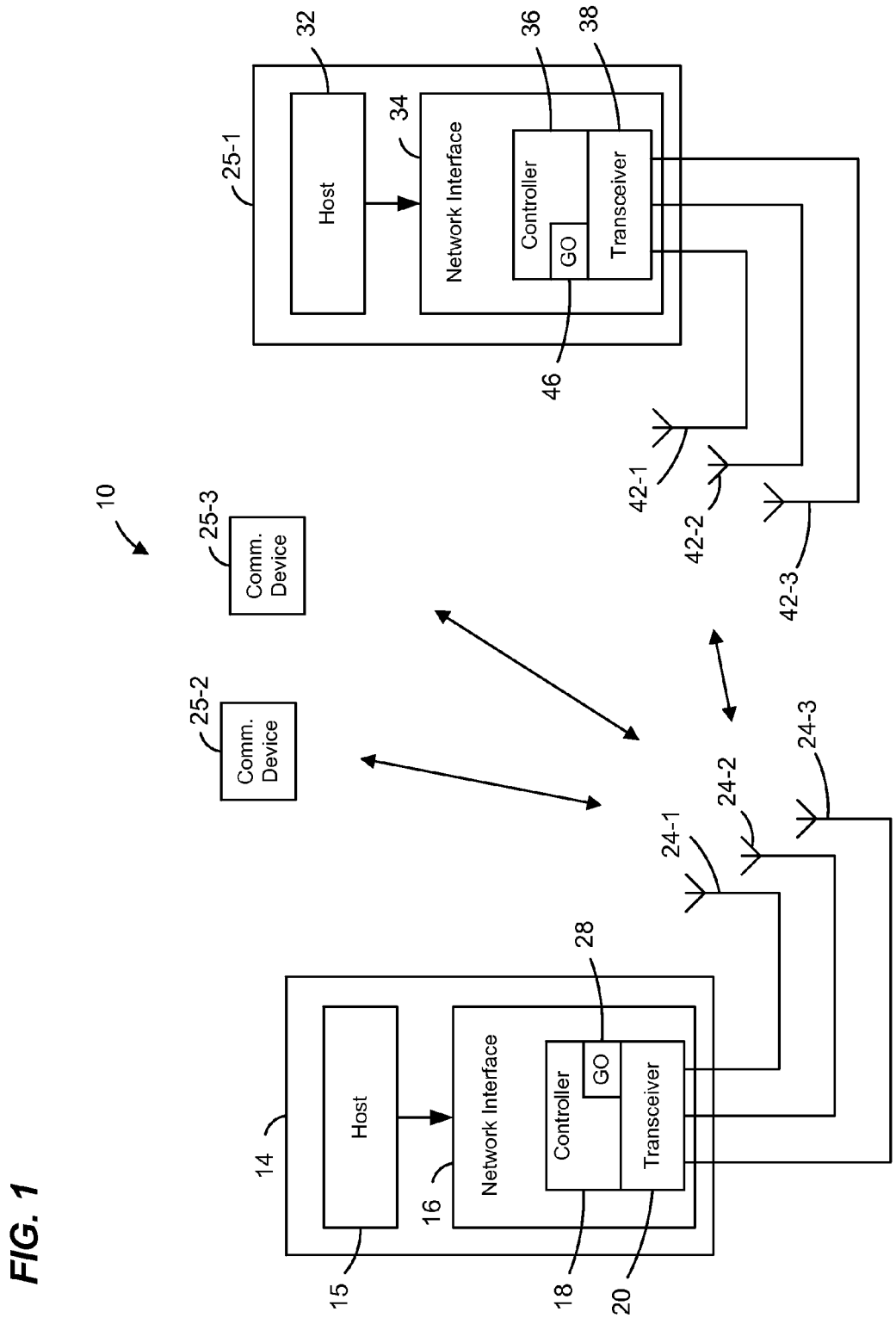
FIG. 1 a block diagram of an example peer-to-peer (P2P) wireless network, according to an embodiment.

FIG. 1 is a block diagram of an example peer-to-peer (P2P) wireless network, according to an embodiment. A communication device 14 includes a host processor 15 coupled to a network interface 16. The network interface 16 includes a controller 18 and a transceiver 20. The transceiver 20 is coupled to a plurality of antennas 24. Although three antennas 24 are illustrated in FIG. 1, the communication device 14 can include different numbers (e.g., 1, 2, 4, 5, etc.) of antennas 24 in other embodiments. In an embodiment, the controller 18 includes a group owner control unit 28. The group owner control unit 28 controls group owner functions when the communication device 14 acts as a group owner, in an embodiment. The group owner control unit 28 also determines when the communication device 14 is to act as the group owner, in an embodiment.

The P2P wireless network 10 also includes a plurality of communication devices 25. Although three communication devices 25 are illustrated in FIG. 1, the P2P wireless network 10 can include different numbers (e.g., 1, 2, 3, 5, 6, etc.) of communication devices 25 in various scenarios and embodiments. A client device 25-1 includes a host processor 32 coupled to a network interface 34. The network interface 34 includes a controller 36 and a transceiver 38. The transceiver 38 is coupled to a plurality of antennas 42. Although three antennas 42 are illustrated in FIG. 1, the communication device 25-1 can include different numbers (e.g., 1, 2, 4, 5, etc.) of antennas 42 in other embodiments. In an embodiment, the controller 36 includes a group owner control unit 46. The group owner control unit 46 controls group owner functions when the communication device 25-1 acts as a group owner, in an embodiment. The group owner control unit 46 also determines when the communication device 25-1 is to act as the group owner, in an embodiment.

In an embodiment, one or both of the communication devices 25-2 and 25-3 has a structure the same as or similar to the communication device 25-1. In these embodiments, the communication devices 25 structured like the client device 25-1 have the same or a different number of transceivers and antennas.

A P2P wireless network such as the P2P wireless network 10 can dynamically form and dissolve as communication devices 14, 25 discover each other and leave the P2P network through time and space.

Generally, P2P discovery occurs when a first P2P device (e.g., the device 14) advertises itself as P2P device, for example, by including an indication that the device 14 is a P2P device in a beacon, a probe request, a probe response, or some other P2P transmission. As used herein, the term "P2P device" refers to a device configured to operate according to a known P2P communication protocol that defines certain P2P communications such as beacons, probe requests and responses, etc. When another P2P device (e.g., the device 25-1) finds the first P2P device 14 (i.e., comes within range and detects the advertisement transmitted by the P2P device 14), the two P2P devices 14, 25-1 perform a procedure defined by the communication protocol and referred to as P2P group owner negotiation. The P2P group owner negotiation results in one of the devices being determined to have a P2P identity of a P2P group owner, and the other device being determined to have a P2P identity of a P2P client. Both the P2P group owner 14 and the P2P client 205 are associated with a P2P group identified by a basic service set identifier (BSSID). After a successful P2P group owner negotiation, the determined P2P group owner and P2P client begin an authentication procedure defined by the communication protocol to establish a P2P connection.

If other P2P devices 25-2, 25-3 discover the P2P group 10 via one of the P2P group members 14, 25-1, the other P2P devices may join the P2P group 10. Any suitable number of P2P clients can be associated with the P2P group 10. In some cases, an addition of a new P2P device to the P2P group 202 can result in a change in P2P group ownership. At any time, an existing P2P client can disassociate itself with the P2P group 202, which may, in some cases, result in a change in P2P group ownership. In some embodiments, the P2P wireless network 200 includes more than one P2P group, and a P2P device can belong to more than one P2P group. In some embodiments, a P2P device can be a group owner in a first P2P group and a P2P client in a second P2P group simultaneously.

A P2P group owner (e.g., the device 14 of FIG. 1) generally manages the P2P group 10. Unlike an infrastructure AP, however, P2P group ownership is not dedicated but is temporal. In particular, the device with which the P2P group ownership is associated can dynamically change over time and/or space. For example, if the current group owner 14 leaves the group 10 (e.g., moves outside of range, powers off, etc.), the devices 25 perform group owner negotiation and determine a new group owner. In some embodiments, the P2P group owner provides one or more of Wi-Fi Protected Setup™ (WPS) internal registrar functionality, communication between P2P clients within the P2P group 10, and access to another P2P group for clients within the P2P group 10.

In an embodiment, a determined P2P client implements WPS enrollee functionality.

In an embodiment, each of the P2P devices 14, 25 includes one or more configurations to support a complete set of P2P functionality, including P2P discovery, Wi-Fi Protected Setup™ (WPS), group owner negotiation, operation as a P2P client, operation as a P2P group owner, and other P2P functionality required by a P2P communication protocol. In an embodiment, the group owner control units 28, 46 each handles P2P group owner negotiation and P2P group owner functions.

Each communication device 14, 25 is, or is included in, for example, a general purpose computer, a portable computer (e.g., a laptop computer, a tablet computer, etc.), a video game console or gaming user device, a portable media device, a smart phone, a printer or other peripheral, a personal digital assistant, etc., according to some embodiments.

The host processor 15 is coupled to a host memory (not shown). According to an embodiment, the host processor 15 comprises a CPU (Central Processing Unit) and the host memory includes computer storage media in the form of volatile and/or nonvolatile memory such as read only memory (ROM), random access memory (RAM), FLASH memory, etc. According to an embodiment, the host memory stores system data, such as identifying and/or manufacturing information. The host memory typically stores data and/or program modules that are immediately accessible to and/or presently being operated on by the host processor 15.

The network interface 16 enables connection to the P2P network 10. In some embodiments, the network interface 16 comprises a Wi-Fi Alliance certified device. The transceiver 20 of the network interface 16 sends messages to and receives messages from other devices 25 in the P2P wireless network 10. In an embodiment, the controller 18 includes a processor that executes computer readable instructions stored in the memory (not shown) coupled to the host processor 15 or another memory (not shown) coupled to the processor.

The host processor 32 of the communication device 25-1 is coupled to a host memory (not shown). According to an embodiment, the host processor 32 comprises a CPU and the host memory includes computer storage media in the form of volatile and/or nonvolatile memory such as ROM, RAM, FLASH memory, etc. According to an embodiment, the host memory stores system data, such as identifying and/or manufacturing information. The host memory typically stores data and/or program modules that are immediately accessible to and/or presently being operated on by the host processor 32.

The network interface 34 enables connection to the P2P network 10. In some embodiments, the network interface 34 comprises a Wi-Fi Alliance certified device. The transceiver 38 of the network interface 34 sends messages to and receives messages from other devices 14, 25 in the P2P wireless network 10. In an embodiment, the controller 36 includes a processor that executes computer readable instructions stored in the memory (not shown) coupled to the host processor 32 or another memory (not shown) coupled to the processor.

In one example scenario, the communication device 14 is the group owner of the P2P network 10, and the other communication devices 25 are clients. In an embodiment, the group owner control unit 28 randomly or pseudo-randomly generates a media access control (MAC) address for use by the communication device 14 while it is group owner. Hereinafter, the term "randomly generated" MAC address is used to refer to both "randomly" and "pseudo-randomly" generated MAC addresses. While the communication device 14 operates as the group owner of the P2P network 10, the group owner control unit 28 causes the network interface 16 to utilize the randomly generated MAC address as opposed to a MAC address assigned to the network interface 16 by a manufacturer of the network interface 16 (referred to hereinafter as the "hardware MAC address"). For example, when transmitting beacons, the network interface 16 includes the randomly generated MAC address in the BSSID, which is included in the beacons. As another example, when transmitting probe responses, the network interface 16 includes the randomly generated MAC address in the BSSID, which is included in the probe responses. As yet another example, when receiving data units transmitted by the other communication devices 25, the network interface 16 assumes that data units having a destination MAC address equal to the randomly generated MAC address are intended for the network interface 16 and/or the communication device 14. As still another example, the network interface 16 responds to data units transmitted by the other communication devices 25 and having a destination MAC address equal to the randomly generated MAC address. For instance, the network interface 16 responds by transmitting data units having a source MAC address equal to the randomly generated MAC address. As yet another example, when transmitting data units as the group owner, the network interface 16 set a source MAC address equal to the randomly generated MAC address.

If the communication device 14 leaves the P2P network 10 (e.g., the communication device 14 travels out of range of the P2P network 10 or powers off), one or more of the other communication devices 25 will determine which device 25 will become a new group owner of the P2P network 10. In one example scenario in which the communication device 25-1 becomes the new group owner, the group owner control unit 46 causes the network interface 34 to utilize the MAC address used by the previous group owner (i.e., the communication device 14) as opposed to a hardware MAC address of the network interface 34. For example, when transmitting beacons, the network interface 34 includes the MAC address used by the previous group owner in the BSSID, which is included in the beacons. As another example, when transmitting probe responses, the network interface 34 includes the MAC address used by the previous group owner in the BSSID, which is included in the probe responses. As another example, when receiving data units transmitted by the other communication devices 25, the network interface 16 assumes that data units having a destination MAC address equal to the MAC address used by the previous group owner are intended for the network interface 34 and/or the communication device 25-1. As still another example, the network interface 16 responds to data units transmitted by the other communication devices 25 and having a destination MAC address equal to the MAC address used by the previous group owner. For instance, the network interface 16 responds by transmitting data units having a source MAC address equal to the MAC address used by the previous group owner. As still another example, when transmitting data units as the group owner, the network interface 34 set a source MAC address equal to the MAC address used by the previous group owner.

Figure 2:
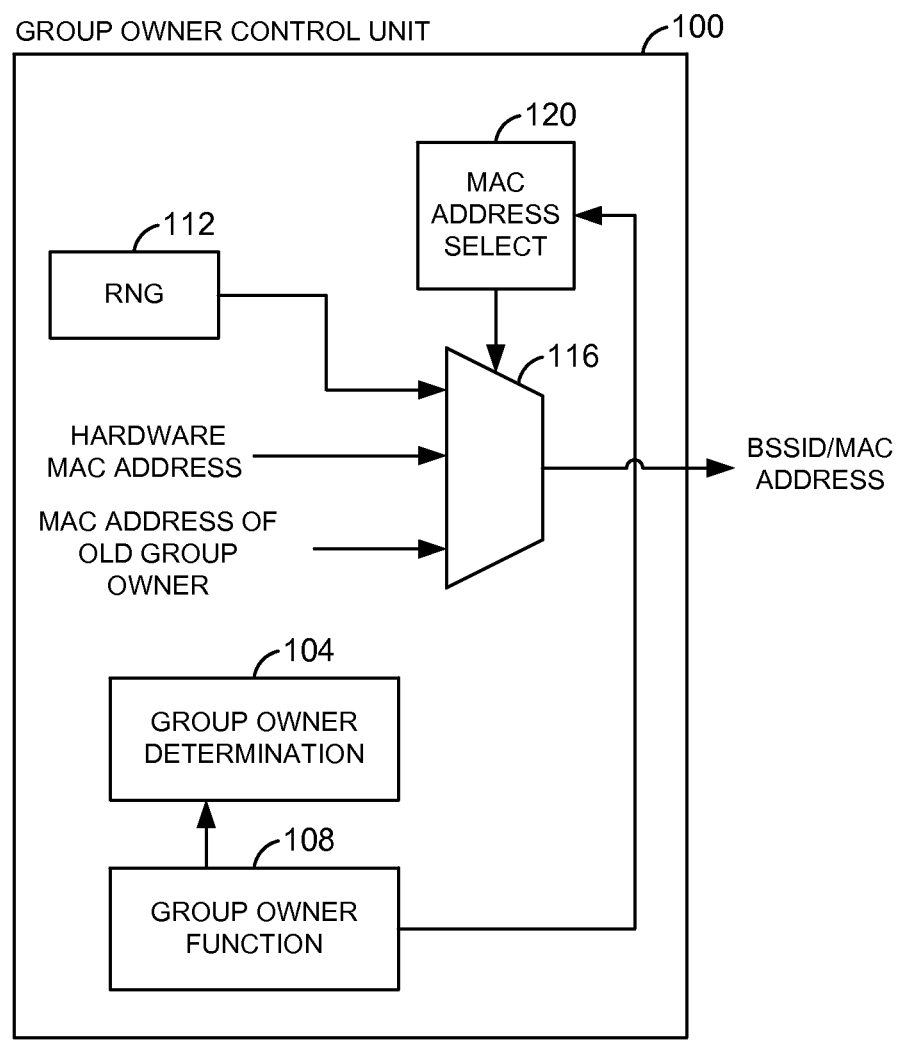
FIG. 2 is a block diagram of an example group owner control unit that is utilized in a communication device of the P2P wireless network of FIG. 1, according to an embodiment.

FIG. 2 is a block diagram of an example group owner control unit 100, according to an embodiment. The group owner control unit 100 is utilized as the group owner control unit 28 and/or the group owner control unit 46, according to some embodiments. In other embodiments, the group owner control unit 28 and/or the group owner control unit 46 are different than the group owner control unit 100.

The group owner control unit 100 includes a group owner determination unit 104 that includes logic that determines when the device that includes the group owner control unit 100 (e.g., the network interface 16 or the communication device 14) is to assume the group owner position in a P2P group. In an embodiment, the group owner determination unit 104 includes logic that handles negotiations with other communication devices regarding which device should be the group owner. In some embodiments, the group owner determination unit 104 includes logic that determines the device is the first group owner and/or that the P2P is in the process of being initially formed. In an embodiment, the group owner determination unit 104 includes logic that determines when another device acting as group owner has left the P2P group. In an embodiment, the group owner determination unit 104 includes logic that determines whether the network interface that includes the group owner control unit 100 should assume status as the group owner in response to determining that another device acting as group owner left the P2P group.

The group owner control unit 100 also includes a group owner function unit 108 that causes the network interface that includes the group owner control unit 100 to operate as the group owner. For example, the group owner function unit 108 causes the network interface to transmit beacons, in an embodiment. As another example, the group owner function unit 108 causes the network interface to transmit probe responses in response to probes transmitted by other devices in the P2P group.

The group owner control unit 100 additionally includes a random or pseudo-random number generator (RNG) 112 that randomly or pseudo-randomly generates numbers suitable for use as a MAC address. A multiplexer 116 is utilized to select one of an output of the RNG 112, a hardware MAC address, or a MAC address of a previous group owner to be used by the network interface that includes the group owner control unit 100. A MAC address select unit 120 controls the multiplexer 116 and determines which of the output of the RNG 112, the hardware MAC address, or the MAC address of a previous group owner to be used by the network interface that includes the group owner control unit 100. For example, when it is determined that the group owner position is being assumed and that the device will be the first group owner and/or the P2P is in the process of being initially formed, the MAC address select unit 120 controls the multiplexer 116 to select the output of the RNG 112, according to some embodiments. As another example, when it is determined that the group owner position is being assumed in response to a previous group owner leaving the P2P group, the MAC address select unit 120 controls the multiplexer 116 to select the MAC address of the old group owner, according to some embodiments.

In another embodiment, the RNG 112 is omitted and the group owner control unit 100 utilizes the hardware MAC address when it is determined that the group owner position is being assumed and that the device will be the first group owner and/or the P2P is in the process of being initially formed. In yet another embodiment, the multiplexer 116 omits an input corresponding to the MAC address of the old group owner. In this embodiment, when it is determined that the group owner position is being assumed in response to a previous group owner leaving the P2P group, the MAC address select unit 120 controls the multiplexer 116 to select the hardware MAC address or the output of the RNG 112.

Figure 3:
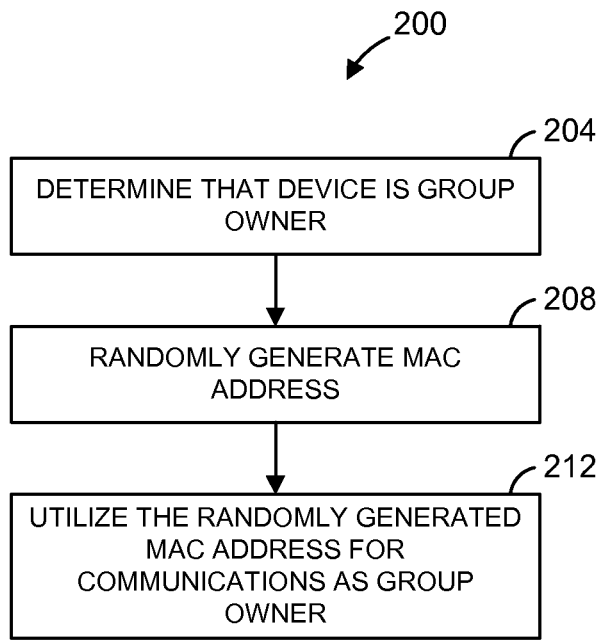
FIG. 3 is a flow diagram of an example method for communicating in a P2P network that is implemented by the group owner control unit of FIG. 2, according to an embodiment.

FIG. 3 is a flow diagram of an example method 200 for communicating in a P2P network, according to an embodiment. The method 200 is implemented by the network interface 16 (FIG. 1), in an embodiment. The method 200 is implemented, at least in part, by the group owner control unit 28 (FIG. 1), in an embodiment. The method 200 is implemented, at least in part, by the group owner control unit 100 (FIG. 2), in an embodiment. In other embodiments, the method 200 is implemented by a network interface and/or a group owner control unit different than the network interface 16, the group owner control unit 28, and/or the group owner control unit 100. The method 200 is described with reference to FIGS. 1 and 2 for ease of explanation.

At block 204, it is determined that a communication device such as the network interface 16 or the communication device 14 is a group owner of a P2P group. The block 204 includes suitable group owner negotiation functions, according to an embodiment. The block 204 is implemented by the group owner control unit 28 and/or the group owner determination unit 104, in some embodiments.

At block 208, a MAC address is randomly generated. The block 208 is implemented by the group owner control unit 28 and/or the RNG 112, in some embodiments. In one embodiment, block 208 is implemented after block 204. In another embodiment, block 208 is implemented before block 204.

At block 212, the MAC address generated at block 208 is utilized for communications as group owner. The block 212 is implemented by the group owner control unit 28 and/or the group owner control unit 100, in some embodiments. For example, the MAC address selection unit 120 selects the output of the RNG 112 as the MAC address when it is determined that the device is the group owner. Similarly, the group owner function unit 108 causes the randomly generated MAC address to be utilized in communications with other devices in the P2P group.

Figure 4:
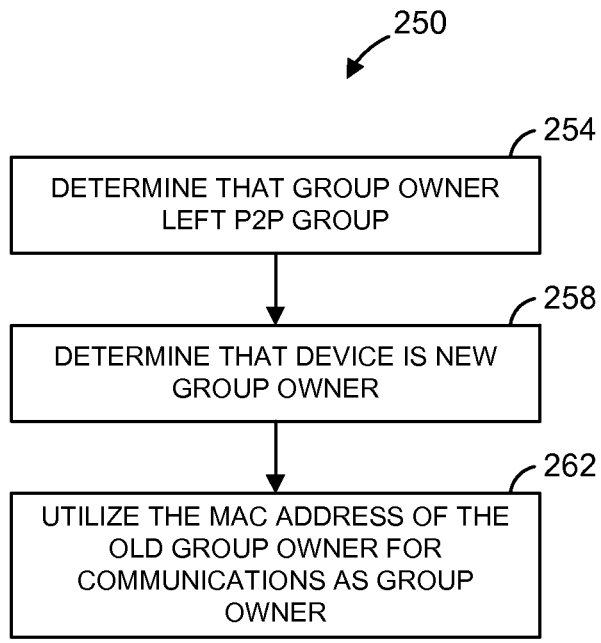
FIG. 4 is a flow diagram of another example method for communicating in a P2P network that is implemented by the group owner control unit of FIG. 2, according to an embodiment.

FIG. 4 is a flow diagram of another example method 250 for communicating in a P2P network, according to an embodiment. The method 250 is implemented by the network interface 16 (FIG. 1), in an embodiment. The method 250 is implemented, at least in part, by the group owner control unit 28 (FIG. 1), in an embodiment. The method 250 is implemented, at least in part, by the group owner control unit 100

(FIG. 2), in an embodiment. In other embodiments, the method 250 is implemented by a network interface and/or a group owner control unit different than the network interface 16, the group owner control unit 28, and/or the group owner control unit 100. The method 250 is described with reference to FIGS. 1 and 2 for ease of explanation.

At block 254, it is determined that a current group owner of a P2P group has left the P2P group. For example, the block 254 includes determining that the current group owner has not transmitted a beacon for an amount of time that indicates the current group owner left the P2P group (e.g., went out of range of the P2P group or powered off), according to an embodiment. The block 254 is implemented by the group owner control unit 28 and/or the group owner determination unit 104, in some embodiments. At this point, the group owner that is determined to have left the P2P group is can be referred to as the old group owner.

At block 258, it is determined that the device, such as the network interface or the device that includes the network interface, is the group owner. The block 258 is implemented by the group owner control unit 28 and/or the group owner determination unit 104, in some embodiments. In one embodiment, the block 258 includes determining that no other device in the P2P group previously assumed the group owner position. In some embodiments, the block 258 includes suitable group owner negotiation functions with one or more other devices in the P2P group. In other embodiments, the block 258 does not include group owner negotiations with other devices in the P2P group.

At block 262, the MAC address of the old group owner is utilized for communications as group owner. The block 262 is implemented by the group owner control unit 28 and/or the group owner control unit 100, in some embodiments. For example, the MAC address selection unit 120 selects the MAC address of the old group owner as the MAC address to be used when it is determined that the device is the group owner and that the old group owner left the P2P group. Similarly, the group owner function unit 108 causes the MAC address of the old group owner to be utilized in communications with other devices in the P2P group.

In one embodiment, a network interface and/or a group owner control unit is configured to implement both the method 200 and the method 250. In another embodiment, the network interface and/or the group owner control unit is configured to implement the method 200 but not the method 250. In still another embodiment, the network interface and/or the group owner control unit is configured to implement the method 250 but not the method 200.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), a field programmable gate array (FPGA), a complex programmable logic device (CPLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for communicating in a peer-to-peer (P2P) wireless network, the method comprising:
   determining that a first communication device is group owner of a P2P group;
   determining whether the P2P group has previously had a prior group owner;
   randomly or pseudo-randomly generating a media access control (MAC) address for the first communication device using a random or pseudo-random number generator included in the first communication device; and
   when it is determined that the P2P group has not previously had a prior group owner, utilizing, at the first communication device, the randomly or pseudo-randomly generated MAC address for the first communication device in group owner communications with one or more second communication devices in the P2P group;
   when it is determined that the P2P group has previously had a prior group owner, utilizing, at the first communication device, a MAC address different than the randomly or pseudo-randomly generated MAC address for the first communication device in group owner communications with one or more second communication devices in the P2P group.

2. A method according to claim 1, wherein determining that the first communication device is group owner of the P2P group comprises negotiating with one or more second communication devices in the P2P group.

3. A method according to claim 1, further comprising, when it is determined that the P2P group has not previously had a prior group owner, selecting the randomly or pseudo-randomly generated MAC address from a group of at least two MAC addresses including (i) the randomly or pseudo-randomly generated MAC address and (ii) a hardware MAC address assigned to the first communication device by a manufacturer of the first communication device.

4. A method according to claim 1, wherein utilizing the randomly or pseudo-randomly generated MAC address for the first communication device in group owner communications comprises transmitting beacons that include a basic service set identifier (BSSID) having the randomly or pseudo-randomly generated MAC address.

5. A method according to claim 1, wherein utilizing the randomly or pseudo-randomly generated MAC address for the first communication device in group owner communications comprises transmitting probe responses that include a basic service set identifier (BSSID) having the randomly or pseudo-randomly generated MAC address.

6. A method according to claim 1, wherein utilizing the randomly or pseudo-randomly generated MAC address for the first communication device in group owner communications comprises responding to data units that include the randomly or pseudo-randomly generated MAC address as a destination MAC address.

7. A method according to claim 6, wherein responding to data units that include the randomly or pseudo-randomly generated MAC address as the destination MAC address includes transmitting data units that include the randomly or pseudo-randomly generated MAC address as a source MAC address.

8. A method according to claim 1, wherein utilizing the randomly or pseudo-randomly generated MAC address for the first communication device in group owner communications comprises transmitting data units that include the randomly or pseudo-randomly generated MAC address as a source MAC address.

9. A communication device, comprising:
a network interface having a random or pseudo-random number generator, the network interface comprising a processor operable to execute computer readable instructions stored in a memory, wherein the instructions, when executed by the processor, cause the processor to
determine that the communication device is group owner of a peer-to-peer (P2P) group,
determine whether the P2P group has previously had a prior group owner,
randomly or pseudo-randomly generate a media access control (MAC) address for the communication device using the random or pseudo-random number generator, and
when it is determined that the P2P group has not previously had a prior group owner, utilize the randomly or pseudo-randomly generated MAC address for the communication device in group owner communications with one or more other communication devices in the P2P group
when it is determined that the P2P group has previously had a prior group owner, utilize a MAC address different than the randomly or pseudo-randomly generated MAC address for the communication device in group owner communications with one or more other communication devices in the P2P group.

10. A communication device according to claim 9, wherein the instructions, when executed by the processor, cause the processor to determine that the communication device is group owner of the P2P group based on negotiations with one or more other communication devices in the P2P group.

11. A communication device according to claim 9, wherein the instructions, when executed by the processor, cause the processor, when it is determined that the P2P group has not previously had a prior group owner, to select the randomly or pseudo-randomly generated MAC address from a group of at least two MAC addresses including (i) the randomly or pseudo-randomly generated MAC address and (ii) a hardware MAC address assigned to the communication device by a manufacturer of the communication device.

12. A communication device according to claim 11, further comprising a multiplexer to select from the group of at least two MAC addresses.

13. A communication device according to claim 9, wherein the network interface is configured to transmit beacons that include a basic service set identifier (BSSID) having the randomly or pseudo-randomly generated MAC address.

14. A communication device according to claim 9, wherein the network interface is configured to transmit probe responses that include a basic service set identifier (BSSID) having the randomly or pseudo-randomly generated MAC address.

15. A communication device according to claim 9, wherein the network interface is configured to respond to data units that include the randomly or pseudo-randomly generated MAC address as a destination MAC address.

16. A communication device according to claim 9, wherein the network interface is configured to transmit data units that include the randomly or pseudo-randomly generated MAC address as a source MAC address.

* * * * *